United States Patent [19]
Bosshart

[11] Patent Number: 5,235,686
[45] Date of Patent: Aug. 10, 1993

[54] COMPUTER SYSTEM HAVING MIXED MACROCODE AND MICROCODE

[75] Inventor: Patrick W. Bosshart, Dallas, Tex.

[73] Assignee: Texas Instruments Incorporated, Dallas, Tex.

[21] Appl. No.: 630,728

[22] Filed: Dec. 20, 1990

Related U.S. Application Data

[63] Continuation of Ser. No. 309,993, Feb. 13, 1989, abandoned, which is a continuation of Ser. No. 18,872, Feb. 24, 1987, abandoned.

[51] Int. Cl.[5] ............................ G06F 9/22
[52] U.S. Cl. ................. 395/375; 364/DIG. 1; 364/359.9; 364/262.7; 364/262.8; 364/271.6
[58] Field of Search .................. 395/375, 500

[56] References Cited

U.S. PATENT DOCUMENTS

| | | | |
|---|---|---|---|
| 3,766,532 | 10/1973 | Liebel, Jr. | 395/775 |
| 3,930,236 | 12/1975 | Ferguson et al. | 395/375 |
| 4,390,946 | 6/1983 | Lane | 395/375 |
| 4,415,969 | 11/1983 | Bayliss et al. | 395/375 |
| 4,434,462 | 2/1984 | Guttag et al. | 395/375 |
| 4,550,369 | 10/1985 | Rokutanda et al. | 395/375 |
| 4,574,344 | 3/1986 | Harris et al. | 395/500 |
| 4,586,127 | 4/1986 | Horvath | 395/375 |
| 4,591,972 | 5/1986 | Guyer et al. | 395/375 |
| 4,631,663 | 12/1986 | Chilinski et al. | 395/375 |
| 4,635,188 | 1/1987 | Williamson et al. | 395/375 |
| 4,825,355 | 4/1989 | Kurakaza et al. | 395/375 |

FOREIGN PATENT DOCUMENTS

| | | |
|---|---|---|
| 0123922 | 11/1984 | European Pat. Off. |
| 0208181 | 1/1987 | European Pat. Off. |
| 56-068878 | 8/1981 | Japan |
| 2011673 | 7/1979 | United Kingdom |

Primary Examiner—Debra A. Chun
Attorney, Agent, or Firm—Frank J. Kowalski; Leo N. Heiting; Richard L. Donaldson

[57] ABSTRACT

A computer system uses microcode subroutines to execute complex macroinstructions. Each macroinstruction is used to index a table. Simple macroinstructions have a single microinstruction counterpart in the table, and such microinstruction is performed directly in order to execute that macroinstruction. The table entry corresponding to more complex macroinstructions is a jump microinstruction, with the target of the microcode jump being an appropriate subroutine in microcode memory.

8 Claims, 6 Drawing Sheets

COMPUTER SYSTEM HAVING MIXED MACROCODE AND MICROCODE

This invention was made with Government support under Contract Number N00039-84-C-0537 awarded by the Space and Naval Warfare Systems Command, U.S. Navy. The Government has certain rights in this invention.

This application is a continuation of application Ser. No. 07/309,993, filed Jan. 13, 1989, abandoned, which is a continuation of application Ser. No. 07/018,872, filed Jan. 24, 1987, abandoned.

BACKGROUND AND SUMMARY OF THE INVENTION

The present invention relates generally to digital computer systems, and more specifically to systems having microcode for execution of complex macroinstructions.

Many modern computer architectures use microcode to support execution of complex macroinstructions. When a macroinstruction, or machine instruction, is read by the central processor, a jump is made to the appropriate microcode subroutine. This subroutine contains the code necessary to implement the macroinstruction.

Such an arrangement has numerous advantages. Single complex ideas can be expressed as one machine instruction. Thus, the programmer is relieved from the burden of producing code for these complex ideas. In addition, care can be taken to ensure that the most efficient microcode is used, which will generally result in more efficient code than that produced by many different programmers. The microcode can even be changed between versions of the same system without affecting programs written at the macroinstruction level.

One drawback of microcode machines is that microcode must be used to support all instructions. There is some minimum amount of processor overhead every time a microcode subroutine is executed. This is especially true with pipelined architectures which must flush the pipeline every time a jump to a microcode subroutine is made. This overhead means that many simple instructions are executed very inefficiently.

It would be desirable for a single computer architecture to have the ability to execute complex instructions, but to also be extremely efficient for execution of simple instructions. An ideal goal would be a system that can execute simple macroinstructions at the maximum microinstruction execution rate of the central processor, one macroinstruction per processor cycle.

It is therefore an object of the present invention to provide a mixed instruction set architecture which supports both complex and simple instructions. Simple instructions are preferably executed at a rate of up to one macroinstruction per clock cycle, while complex machine instructions are also supported.

Thus, a computer system designed according to the present invention uses microcode to support execution of complex instructions. When a new machine instruction, (macroinstruction) is read, the instruction code is used to index a special look-up table. If the macroinstruction is a simple type which has a corresponding single microinstruction, the entry in the look-up table contains that corresponding microinstruction. The system directly executes the microinstruction found in the look-up table, and then reads the next macroinstruction.

If a particular macroinstruction is complex, and requires a microcode subroutine to execute, the corresponding entry in the look-up table is a jump instruction having a target which is the appropriate microcode subroutine.

This system can be combined with a pipelined architecture for increased throughput. When a pipelined architecture is used, a macroinstruction queue can be used to buffer macroinstructions. When a macroinstruction causes a jump to a microcode routine, the next macroinstructions are not lost, even through they are flushed somewhere in the pipeline. Macroinstructions not yet executed are retained in the queue until control returns from the microcode routine, at which time they re-enter the pipeline.

The novel features which characterize the present invention are defined by the appended claims. The foregoing and other objects and advantages of the present invention will hereafter appear, and for purposes of illustration, but not of limitation, a preferred embodiment is shown in the accompanying drawings.

DESCRIPTION OF THE PREFERRED EMBODIMENTS

Figure 1:
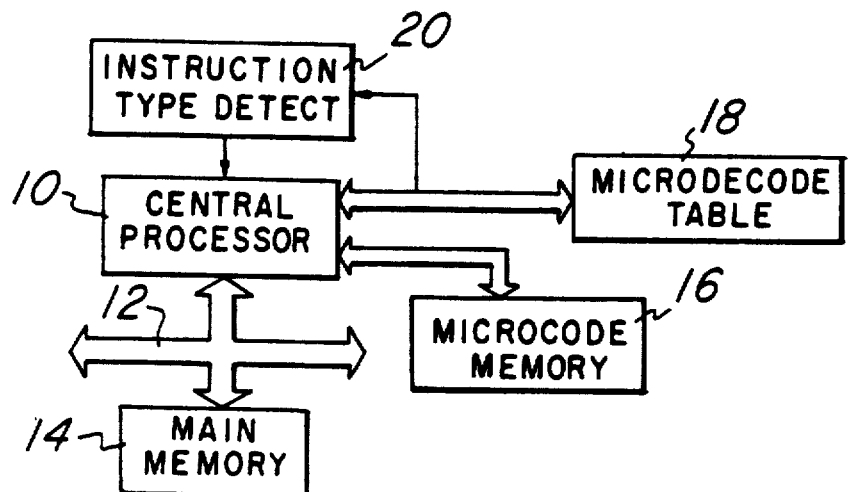
FIG. 1 is a block diagram of a system for executing macrocode and microcode instructions.

FIG. 1 illustrates the salient features of a computer system which is capable of executing macrocode instructions directly as well as implementing complex instructions in microcode. As will be used below, macrocode instructions are the machine language level instructions for a given computer system. A macroinstruction may be fairly complex, such as division of two floating point numbers, but it is still expressed as a single instruction in the native machine language of the computer. Microcode is used to actually perform the simple steps necessary for execution of a single macrocode instruction. Thus, in the divide example, many machine cycles are generally necessary to perform a single divide instruction. Macroinstructions can be executed by jumping to a subroutine stored in a microcode memory and executing that subroutine. Once the macrocode subroutine is completed, control moves to the next macroinstruction to be executed.

The microcode of a computer system is generally not available directly to the programmer. In some systems, such as the Explorer symbolic computer from Texas Instruments, the microcode memory is actually a RAM which is loaded with the actual microinstructions at system boot-up time. This allows the processing system to be configured in different ways, and optimized for the particular task at hand. However, the microcode is still not directly accessible to application programs running on the system. Changing the microcode merely changes the macroinstructions which are available to the system.

FIG. 1 shows a block diagram of a system which is capable of executing simple macrocode instructions directly, and more complex instructions by calling microcode routines. A central processor (10) is connected to a main system bus (12). A main memory (14) is also connected to the system bus (12). System bus lines include data and address lines, as well as various control lines. In an actual system, additional devices would be connected to the system bus (12), such as I/O and mass storage devices, but such are not shown since they are not necessary to an explanation of the present invention.

A microcode memory (16) is coupled to the central processor (10). This can be an independent random access memory which is loaded with microcode at system boot-up time, such as the Texas Instruments Explorer, or it can be a ROM or EPROM which is built into a central processor chip, or which is external to such chip. The microcode memory may be of nearly any type.

Also coupled to the central processor (10) is a macrocode table (18). This is a memory preferably of the same type as the microcode memory (16). In fact, as described below in connection with FIGS. 7 and 8, the macrocode table (18) may be nothing more than a reserved block within the microcode memory (16). Instruction type detect logic (20) is coupled to the central processor (10) and to the macrodecode table (18) for determining whether an instruction indexed in the macrodecode table (18) is a macro-mode instruction, which can be executed directly in a single processor cycle, or a micro-mode instruction, which requires that a microcode routine be called to execute that macroinstruction. The type detect logic (20) is very simple, since it need only detect a flag bit, or multiple flag bits, in a macrodecode table (18) entry, and may be incorporated as part of the central processor (10).

Figure 2:
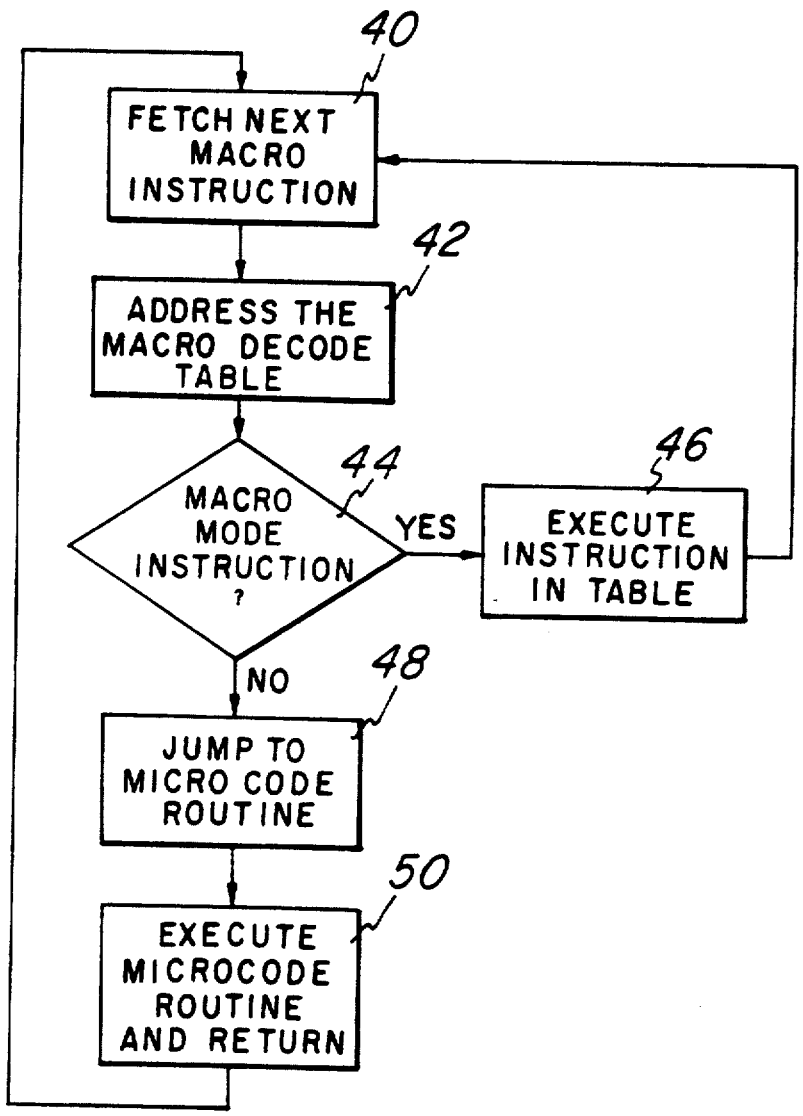
FIG. 2 is a flow chart for use with the system of FIG. 1.

FIG. 2 is a flow diagram which illustrates operation of the system above in FIG. 1. The first step (40) in the instruction execution loop is to fetch the next macroinstruction. Macroinstructions may be fetched directly from main memory (14) as needed, or may be stored in a prefetch buffer within the central processor (10). Many methods for buffering and optimizing prefetch algorithms are known to those skilled in the art, and the particular method in which a macroinstruction is fetched is not of import to this description.

Once the next macroinstruction has been fetched, this instruction is used to address the macrodecode table (step 42). The macrodecode table (18) can be considered to be a look-up table having a number of entries which is equal to the number of possible macroinstructions. For example, if 10 bit macroinstruction types are used, the macrodecode look-up table (18) would preferably have $2^{10} = 1024$ entries.

The macrodecode table (18) is itself a table of microinstructions. Some macroinstructions map directly to a single microinstruction. These instructions are generally the simple ones which as clearing internal registers, jumps, setting or resetting control flags, and many register to register mathematical and logical operations. For such macroinstructions, sometimes referred to as "macromode instructions", the corresponding entry in the macrodecode table (18) is precisely that microinstructions which performs that operation.

One field of the microinstructions contained in the macrodecode table (18) is an indicator which shows whether or not this macroinstruction is a macromode instruction or a micromode instruction. The indicator field which is used is that which indicates the TYPE of the microinstruction. In the preferred embodiment, a microinstruction can have one of four types. ALU and BYTE instructions are those which execute and allow control to pass to the next microinstruction. JUMP instructions transfer control to a microinstruction other than the one following, and DISPATCH is a multi-way JUMP. ALU and BYTE types allow the processor to stay in macromode, while JUMP and DISPATCH force a jump to microcode.

The next step (44) in the flowchart shows that this indicator field is tested, and if the macroinstruction is a macromode instruction the microcode instruction held in the macrodecode table (18) is executed directly (step 46). After such microinstruction is executed, the next macroinstruction is fetched and the cycle repeats.

Many macroinstructions, such as function calls, as well as complex instructions such as floating point arithmetic, must call a microcode routine for execution. The indicator field in the macromode table (18) indicates that such macroinstructions are not macromode instructions, and the NO branch is taken from the decision step 44. For these instructions, a jump is made to the appropriate microcode routine, (step 48) which is then executed (step 50). For macroinstructions which are not macromode instructions, the microcode instruction entry in the macrodecode table (18) is actually a JUMP or DISPATCH instruction giving the address of the appropriate microcode routine as the destination of the JUMP or DISPATCH. Once the microcode routine has been executed, control is returned from microcode and the next macroinstruction is fetched.

Figure 3A:
FIG. 3 shows typical simplified macroinstruction and microinstruction formats for use with the present invention.

FIG. 3 shows simplified instruction formats for macroinstructions and microinstructions. FIG. 3(a) shows that a macroinstruction includes an instruction field, which is sometimes referred to the op-code, and other control information. For the purposes of this description, the control information is intended to include all immediate data, register identification, and any other information other than the op-code.

Figure 3B:

FIG. 3(b) shows that a microinstruction is similar, with the addition of a TYPE field. The preferred embodiment has the four TYPEs described above, so the TYPE field is 2 bits wide. The instruction field of a microinstruction is not necessarily at all similar to the instruction field of a macroinstruction, and the control information is everything else which is necessary to control the micro operations of the central processor. The instruction and control fields of the microinstructions are not necessarily distinguishable. In the example shown, for purposes of illustration and discussion in connection with FIGS. 7 and 8, the instruction field of macroinstructions is 10 bits long, and control and other information is 6 bits, giving a total of 16 for the width of a macroinstruction. The macroinstruction width is commonly an integral multiple of eight bits, such as 16 or 32.

Microinstructions have a type field having a width of two bits, so that four different types may be identified. In some systems, only a single bit may be necessary to distinguish micromode and macromode type instructions. The instruction itself has a length of 64 bits, including the various control bits. The values described for instruction widths are for purposes of illustration only; they can, and do, vary greatly depending on the computer system under consideration.

The system described above may be adapted for use in any computer system. One particular utilization of the concepts described above will now be described in connection with their use on a Texas Instruments Explorer symbolic computer. Descriptions of the instruction pipeline and interleaved, off-chip microcode memory access are described in copending U.S. patent application Ser. No. 761,220, titled INTERLEAVED MICROINSTRUCTION MEMORY, by Bosshart, filed Jul. 31, 1985, now abandoned.

Figure 4:
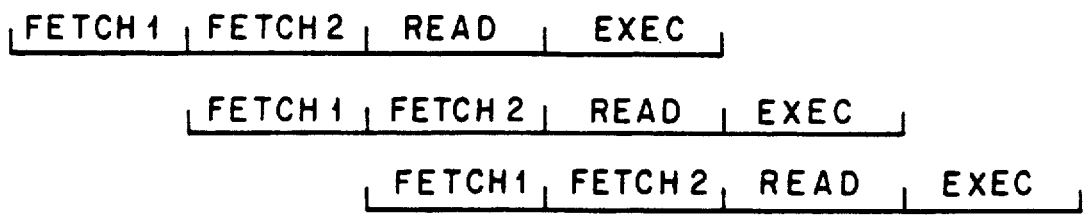
FIG. 4 illustrates operation of an instruction pipeline for use with a specific embodiment of the present invention.

FIG. 4 illustrates the standard instruction pipeline for this embodiment. Because the off chip microcode memory is not fast enough to be accessed in a single processor cycle, a two-stage fetch is required to retrieve instructions accessed in the microcode memory. Thus, the instruction pipeline consists of four stages; FETCH1, FETCH2, READ and EXECUTE, If a WRITE is part of the instruction, that step takes a fifth stage. During the FETCH1 stage, the macroinstruction is placed on the address lines to the macrodecode table (18). Valid data is available on the data outputs of the macrodecode table (18) at the end of the FETCH2 stage. The READ stage involves taking the returned data from the macrodecode table (18), which is latched into an instruction buffer, and accessing all necessary latches, etc. required by the instruction. This READ stage also involves a certain amount of decoding of the instruction. The EXECUTION stage is the actual ALU or other operation to be performed by the instruction.

The pipeline shown in FIG. 4 is valid for both macroinstructions and microinstructions. That is, when macroinstructions are executed serially, and all of the macroinstructions are macromode type instructions, one macroinstruction will be executed for every processor clock cycle. If the processor clock rate is 40 MHz, macroinstructions can be executed at that rate.

When microinstructions are being executed in a microcode routine, the same execution rate applies. That is, serial execution of a block of microcode can also be done at the maximum rate of the processor. Note that this maximum execution rate will seldom occur for any extended period of time for either macroinstructions or microinstructions. Whenever jumps or branches are made, it is generally necessary to flush the pipeline and restart. Further details of this pipeline are described in U.S. patent application Ser. No. 761,220, INTERLEAVED MICROINSTRUCTION MEMORY, now abandoned, and pipelining of instructions generally is well known to those skilled in the art.

Figure 5:
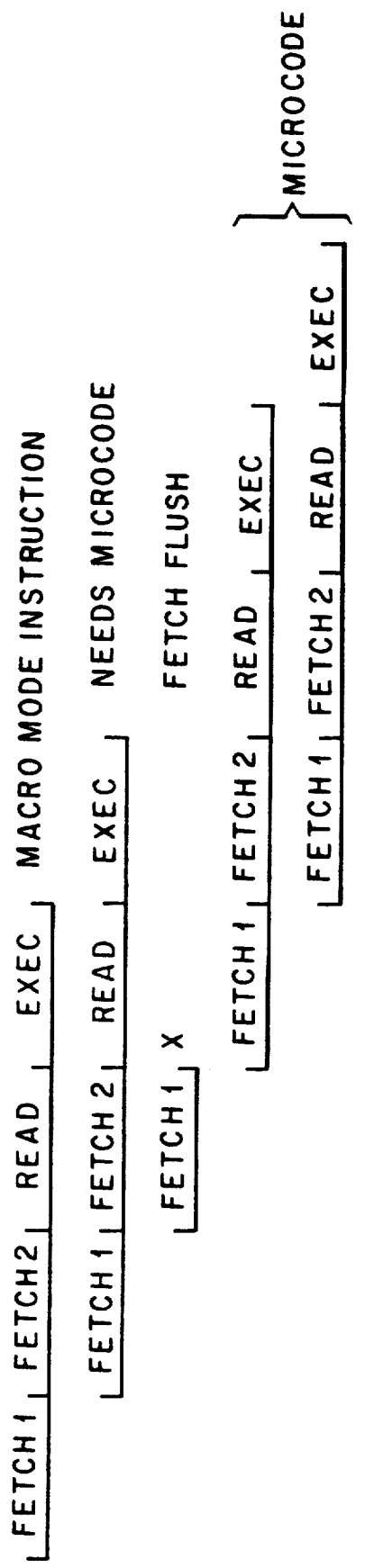
FIG. 5 illustrates operation of an instruction pipeline when a jump to microcode is made.

FIG. 5 shows the operation of the pipeline when a macroinstruction is not a macromode instruction; that is, it requires a jump to a microcode subroutine for execution. The first line represents execution of a simple macromode macroinstruction. The second line represents a macroinstruction which requires a microcode subroutine for execution. This determination is made at the end of the FETCH2 stage. The following macroinstruction, which is just completing its FETCH1 stage, is flushed. Since the macroinstruction which needs microcode reads from the macrodecode table (18) a microinstruction which is a jump to a microcode routine, such jump is executed immediately. This is accomplished by placing the jump address of the microinstruction obtained from the macrodecode table (18) onto the microcode address line. This action initiates the FETCH1 stage of the first microcode instruction of the subroutine. Thus, it is seen that there is a minimum 2 clock cycle latency between the breaking of the macromode pipeline and beginning of the microcode routine.

Figure 6:
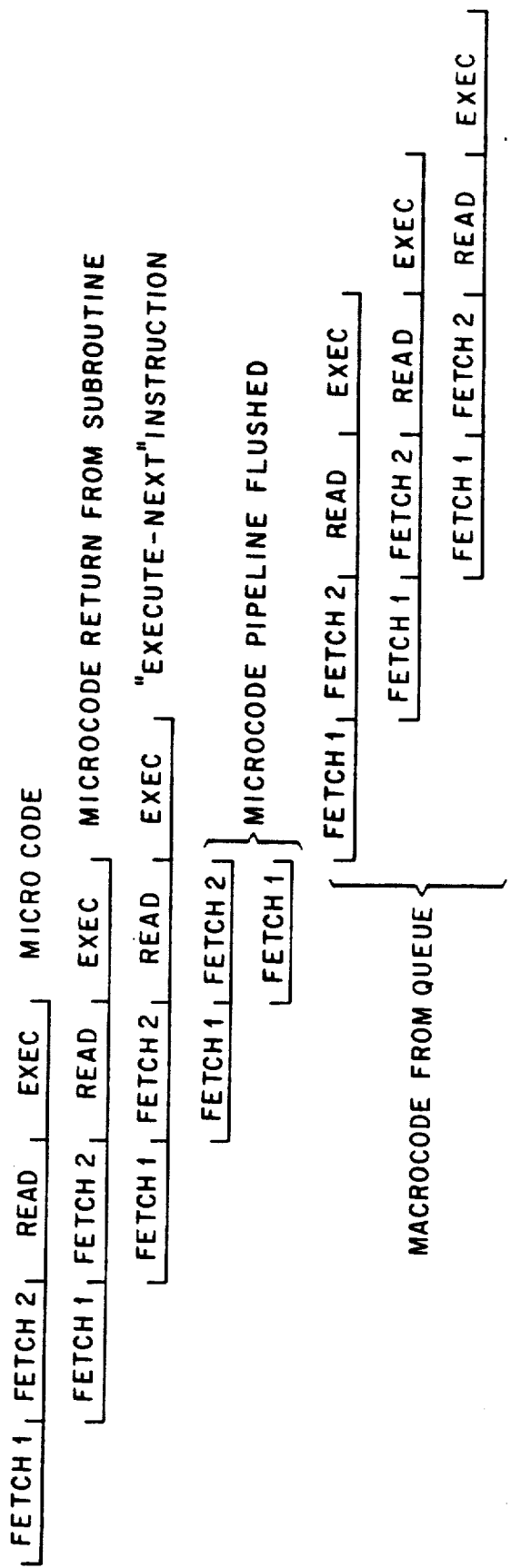
FIG. 6 illustrates operation of the same instruction pipeline when control is returned from a microcode subroutine.

FIG. 6 shows the status of the pipeline when the microcode routine is completed, and execution of macroinstructions is resumed. The first line illustrates normal execution of a microcode instruction. The second line is the return instruction from the microcode subroutine, which indicates that the processor should also return to macromode and continue executing macroinstructions. An "Execute-Next" instruction follows the return instruction, and is executed before the return is completed. If no instruction is desired, or possible, here, this instruction can be a no-op instruction. Use of Jump-Execute-Next to improve efficiency of jumps in pipelined architectures is well known in the art. While the Execute-Next instruction is executing, the next macroinstruction is immediately fetched from a macroinstruction queue, as will be described below, and the macroinstruction pipeline is restarted.

Figure 7:
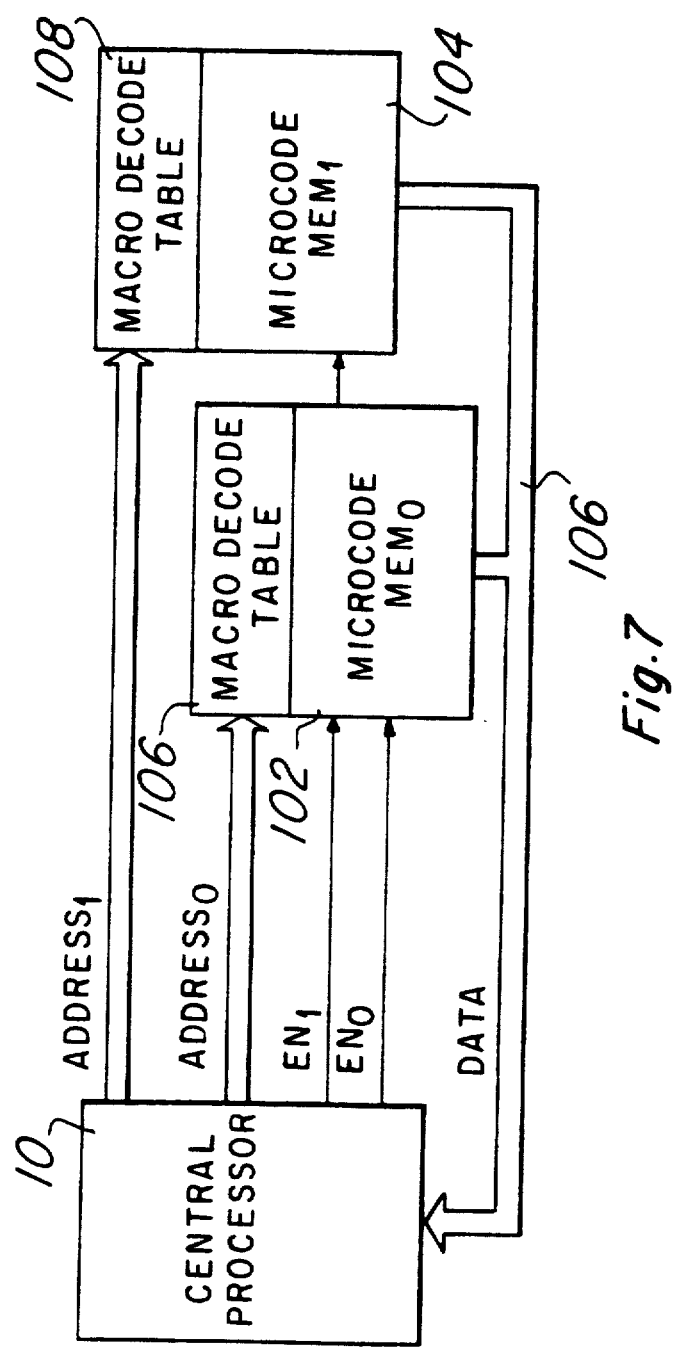
FIG. 7 is a block diagram illustrating the use of the present invention with a central processor having interleaved off-chip microcode memory.

FIG. 7 shows a block diagram of the central processor and microcode memory which is used with the above described pipeline. As described in U.S. patent application Ser. No. 761,220, INTERLEAVED MICROINSTRUCTION MEMORY, now abandoned, two sets of address lines are used to address interleaved microcode memories (102, 104). MEM1 contains only odd addresses, while MEM0 contains even addresses. This allows consecutive addresses in the microcode memory map to be accessed simultaneously by the central processor (10). Thus, the cycle time of the actual memory devices used for the microcode memory (102, 104) can be nearly twice that of the central processor without introducing wait states. Note that unused processor cycles, equivalent to wait states, will occur when jumps are made in the execution of microinstructions. This occurs because the interleaved microcode fetch acts as the first two stages of the pipeline described in FIGS. 4 and 6. The data outputs from the microcode memories (102, 104) are connected to the same bus (107), with only one of the microcode memories being enabled by signals EN0 or EN1 during any given clock cycle. The data output on the microcode memories are microinstructions.

Two identical copies of the macrodecode table (106,108) are found in a reserved block of each microcode memory (102,104). One copy is used for odd microcode addresses, and the other is used for even addresses. Typical locations for the tables would be in either low microcode memory, or high memory. The address generated by the macroinstruction is shorter than that needed to access the microcode memories (102,104). The macroinstruction op-code is used for the LSB part of the address into each memory, and placing the macrodecode tables (106,108) in low or high memory allows the remaining address lines to be driven to all high or low. Duplicate copies of the macrodecode tables (106,108) are needed because the microcode memories (102,104) are too slow to be accessed every clock cycle. Alternate macroinstructions are used to index into alternate macrodecode tables (106,108).

Figure 8:
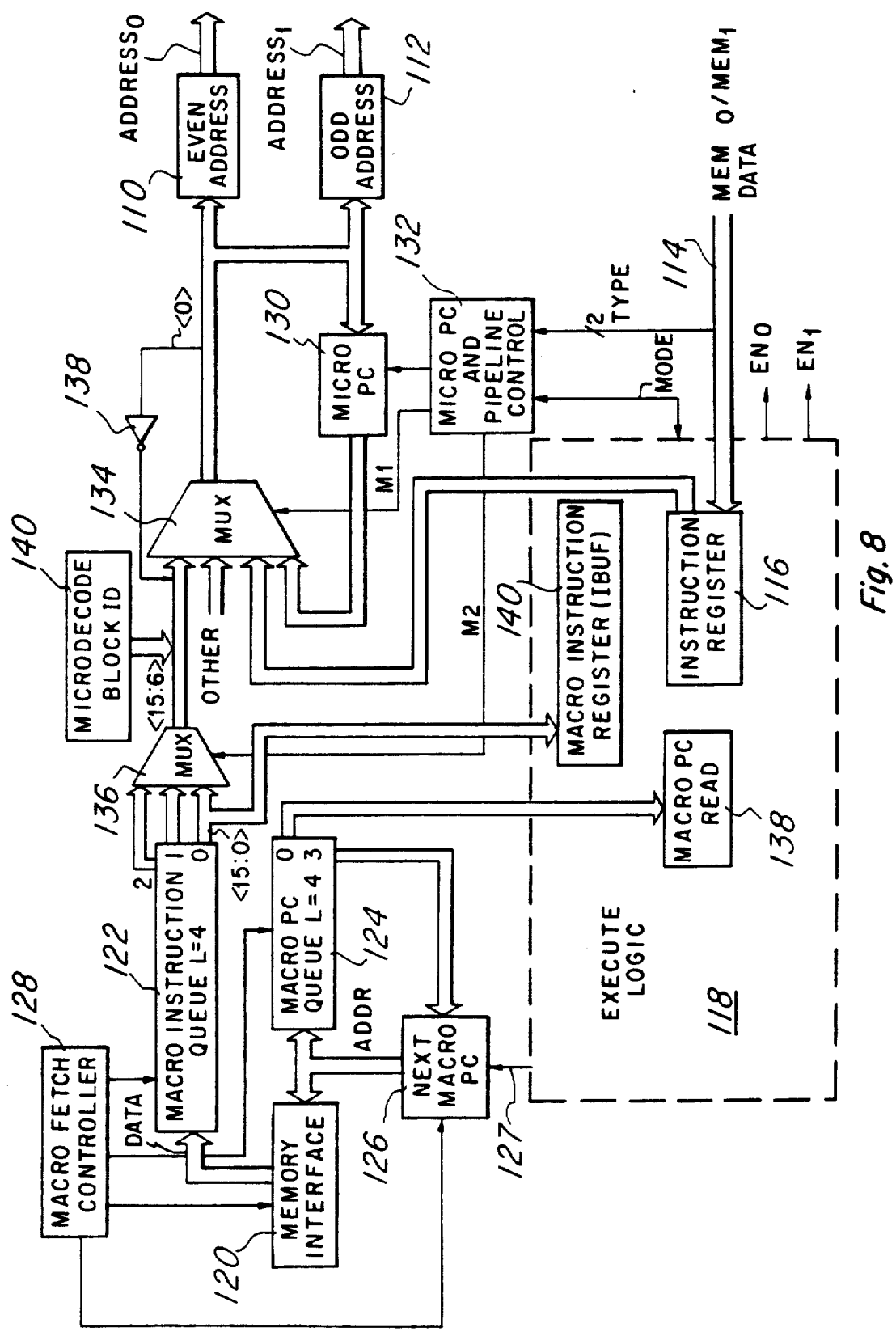
FIG. 8 is a block diagram showing details of operation of the central processor of FIG. 7.

FIG. 8 shows a block diagram of the hardware needed in the central processor (10) to implement the macromode operations described above. This is a simplified logic diagram used to show the features of the invention, and can actually be implemented in many different ways.

Even address and odd address latches (110, 112) hold ADDRESS0 and ADDRESS1 being supplied to the even and odd banks of the microcode memory (102, 104), respectively. The data bus from the microcode memories (114), containing microinstructions, is latched in an instruction register (116). The execute logic (118) of the central processor (10), including the typical ALU and logic operations performed by a central processor, reads the microinstruction from the instruction register (116). A macroinstruction queue (122) retrieves macroinstructions from the main bus through a memory interface (120). In parallel with the macroinstruction queue (122) is a macro PC queue (124). This queue (124) holds the program counter corresponding to each of the macroinstructions of the macroinstruction queue (124). A Next Macro PC (126) is used as the program counter generator for macrocode routines, and is controlled in part by signal 127 from the exercise logic (118). Next Macro PC (126) is part of the macroinstruction prefetch logic, which is similar to that found in many current processors.

A macro fetch controller (128) is also a part of the macroinstruction prefetch logic. This controller (128) controls the flow of data through both the macroinstruction queue (122) and the macro PC queue (124). Both queues (122, 124) move in lockstep, so that the correct macroinstruction PC is always associated with its macroinstruction. The macro fetch controller causes both queues (122,124) to behave as ideal queues having no flow through latency. Those skilled in the art are familiar with the design of such queues. The preferred queues (122,124) have a length of 4, with the positions numbers 0-3. 0 is the head of queue position.

When the processor is running microcode, a micro PC (130) generates the next microcode address. A micro PC controller (132) is responsible to operation of the micro PC generator and for control of the pipeline. It controls the pipeline primarily through control signals M1, connected to multiplexer (134), and M2, coupled to multiplexer (136).

The execute logic (118) also includes a macro PC read register (138) and a macroinstruction read register (IBUF) (140). These registers hold the current values of the macroinstruction and its programs counter which are in the read stage of the pipeline. Execute logic (118) also generates the signals EN0 and EN1 for controlling the microcode memories (FIG. 7) and controls the timing of the microcode address buffers (110,112).

When a series of macromode macroinstructions is being executed, a new macroinstruction is placed onto one of the address buffers (110, 112) during each processor clock cycle. Control line M1 causes multiplexer (134) to pass through the signal received from multiplexer (136). This signal has the macroinstruction opcode. Since the macroinstruction does not completely specify an address in microcode memory, additional signals are added. The LSB of the previous microcode address is complemented in inverter (138), and used as the LSB of the new address. Complementing the LSB of the previous microcode address causes consecutive macroinstructions to be placed on alternating microcode memory address latches. This is necessary for the two stage prefetch of the pipeline to function properly.

A preset microcode block identifier (140) generates the location of the reserved block containing the macrocode table (106, 108). As described previously, placement of the macrodecode tables (106, 108) at the high or low end of microcode memory allows the block identifier to be all 1's or all 0's respectively.

Control signal M2 selects which entry from the macroinstruction queue (122) will be used for the next address. This is generally not the instruction currently at the head of the queue (position 0). As described in connection with FIG. 5, a jump into microcode causes a flush of the macroinstruction which is currently in the Fetch 2 stage. If macroinstructions are removed from the queue (122) as soon as they enter the fetch portion of the pipeline, macroinstructions will be lost whenever a jump is made to microcode.

Therefore, the pipeline control (132) utilizes the multiplexer (136) to access any of positions 0-2 in the macroinstruction queue (122). An instruction does not leave the queue until the clock cycle in which it enters the read stage of the pipeline. This means that if the previous macroinstruction necessitates a jump to microcode (ie, it is not a macro mode instruction), the instruction currently in the queue remains there. In the case of several consecutively executed macroinstructions, several things happen at the beginning of each processor cycle. The first instruction is latched in the IBUF (140), and leaves the queue. The instruction in position 1 moves to position 0. It is already completed its Fetch1 stage, so it has already been used to generate a microcode address to look up an entry in the macrodecode table. The instruction in position 2 moves to position 1, and is used to generate the next microcode address to access the macrodecode table. Any other instructions in the queue also move up 1 position, and a new one can now be placed in position 3 by the macro fetch controller (128).

At the start of each clock cycle, a microinstruction is available in the instruction register (116). This microinstruction corresponds to the macroinstruction which has just been latched into the IBUF (140), and pushed out of the macroinstruction queue (122). The macro PC, the entire macroinstruction, and the corresponding micro instruction are all available to the execute logic at this time. The read stage is accomplished, which fetches any register values needed in the execution of the microinstruction, etc. In the following clock cycle, the microinstruction will be executed.

The pipeline controller (132) determines that this instruction is a macromode instruction by examining the TYPE bits of the microcode. If the processor is already operating in macromode, and the microinstruction is of the correct type, the processor remains in macromode and continues to process macroinstructions. In the Explorer from Texas Instruments, based on the MIT CADR machine, macromode instructions are those which are of type ALU and BYTE. JUMP and DISPATCH instructions are not macromode instructions. If an ALU or BYTE microinstruction is present in the instruction register (116), and the current MODE is macromode, the processor remains in macromode. The MODE signal is always communicated between the pipeline controller (132) and the execute logic (118).

When a macroinstruction requires microcode support, as shown in FIG. 5, the processor changes out of macromode. The pipeline controller (132) detects the microinstruction TYPE at the beginning of the read stage. As described above, the microinstruction in the instruction register (116) is a jump instruction, and the pipeline controller connects the jump destination to the appropriate address latch by using control signal M1.

The MODE signal reflects that the processor is no longer in macromode. Succeeding microinstruction addresses will be generated under the control of the controller (132) by micro PC (130). If any jumps are made within the microcode routine, this will be detected by the pipeline controller (132) in the same manner as detection of jumps out of macromode, with the destination address being taken from the instruction register (116). Note that execution of microinstructions of type ALU or BYTE do not cause the processor to return to macromode if it is currently operating in micromode.

FIG. 8 shows a signal labelled OTHER connected to the multiplex 134. This represents other signals which can be used for microcode addresses. For example, if an error condition is detected, it may be necessary to trap to a microcode handler. The pipeline handler causes the appropriate OTHER signal to be connected to an address latch (110, 112). An example of such a trap is a page fault in a virtual memory system supported by microcode. The handling of these OTHER signals depends on the details of the particular system design.

When a microcode routine which implements a macroinstruction is completed, a special return from subroutine instruction is executed as described shown in FIG. 6. Execution of this instruction causes the processor to return to the macromode state. Since MODE now indicates macromode, the next instruction to be fetched is the one at the head of the macroinstruction queue (122). The instruction in position 0 is used to address the macrodecode table. Note that at this same time the Execute-Next microinstruction is in the execute stage. The first macroinstruction is applied to the address register opposite that most recently accessed, as determined by the complemented LSB taken from the most recent microinstruction.

In the next clock cycle, the macroinstruction in position 1 of the queue (122) is connected to an address latch, thus entering the Fetch1 stage. The instruction in position 0, now in the Fetch2 stage, remains in the macroinstruction queue (122). At the end of this cycle, the microinstruction corresponding to the macroinstruction in position 0 will be available in the instruction register (116).

In the following clock cycle, normal operation resumes. The macroinstruction in position 0 leaves the buffer, and undergoes the read stage. The instruction in position 1 moves to position 0, and the instruction in position 2 is connected to the appropriate address latch (110, 112) through the multiplexers (136 and 134). This instruction is also advanced to position 1 in the queue (122).

System variations can easily be accommodated by variations of the above description. In the microcode memory is fast enough that it can be accessed in a single clock cycle, only a single fetch stage is needed in the pipeline. This means that only one address latch is needed. Also, the pipeline control (132) need only be able to reach back one position in the macroinstruction queue, instead of two positions as described above. However, the principle is the same: an instruction is not removed from the queue (122) until it enters the read stage, which means that the processor has committed to execute that instruction. Details of extracting macroinstructions from the queue can vary with the particular implementation of the queue (122).

TECHNICAL ADVANTAGES

The use of the system described above allows one to execute simple macroinstructions at the maximum rate of the processor. The overhead normally associated with microcode subroutine calls for simple instructions is eliminated. The overall throughput of the processor can be greatly increased if even a moderate proportion of the instructions executed are of the simple variety.

The use of a macroinstruction queue as described above allows a minimization of the overhead necessary to make a jump into microcode when that is necessary. The jump is detected at the end of the fetch; it is not necessary to actually execute the jump microinstruction in the execute stage to begin the process of loading the appropriate microcode routine. Macroinstructions already in the pipeline are saved because they are not removed from the queue until they are committed to execution. When the system returns from the microcode routine, the pipeline controller can reach back into the queue to fetch several macroinstructions while retaining the first one at the head of the queue until its execution is committed to.

The present invention has been illustrated by the system and methods described above, and it will become apparent to those skilled in the art that various modifications and alternations made be made thereto. Such variations fall within the spirit of the present invention, the scope of which is defined by the appended claims.

What is claimed is:

1. A digital computer system having the ability to execute certain machine instructions in a single clock cycle, comprising:
   (a) a central processor for executing machine instructions wherein certain machine instructions are executed by executing a single microcode instruction and certain other machine instructions are executed by executing a routine of microcode instructions;
   (b) a main memory coupled to said central processor and having machine instructions stored therein to be executed by said central processor,
   (c) a microcode memory coupled to said central processor having microcode instructions including a first set and a second set of microcode instructions stored therein, said first of said microcode instructions being addressed by a starting microinstruction address, said first set of microcode instructions containing microcode instructions of a first type having a type field portion indicating that the instruction is one of a single microcode instruction for executing a machine instruction and microcode instructions of a second type having a type field portion indicating a routine of multiple microcode instructions which must be executed to perform a single machine instruction, said second set corresponding to said routines of multiple microcode instructions;
   (d) a machine instruction decoder coupled to said main memory and operative to fetch a machine instruction from said memory and to generate said starting microinstruction address in said microcode memory, wherein said starting microinstruction address points to said microinstruction having a one-to-one correspondence to said machine instruction; and (e) decode and transfer means coupled to said central processor and said microcode memory to decode and transfer said microcode instructions from said microcode memory at said microinstruction address to said central processor for execution by said central processor;

(f) said decode and transfer means including means responsive to decoding of said microcode instruction in said first set to determine the type field thereof, and means responsive to said instructions of said first type for causing said machine instruction decoder to process the next available machine instruction and responsive to said microcode instructions of said second type for causing a jump to a microcode routine which is executed to completion before causing said machine instruction decoder to process the next machine instruction.

2. The system of claim 1, wherein all of the microcode instructions in the first set are located contiguously in memory, and wherein a portion of each machine code instruction is used to directly address the corresponding microcode instruction.

3. An instruction prefetch queue circuit for a computer system, comprising:

(a) an instruction queue of length n and having a head, for holding macroinstructions to be performed;

(b) a program counter queue of length n, having a head, for holding program counters therein corresponding to the macroinstructions in said instruction queue, and operating in step with said instruction queue;

(c) a pipeline controller coupled to said instruction queue for selecting an instruction from said instruction queue;

(d) first means responsive to said selected instruction to generate a starting microinstruction address; and (e) second means responsive to said starting microinstruction address operable to fetch a starting microcode instruction, and subsequent to completing said fetch, operable to remove instructions from said head of said instruction queue and to remove a program counter from said head of said program counter queue and operable to return said fetched microcode instruction to a processor for execution;

wherein said selected instruction is the instruction closest to the head of said instruction queue which said second means has not yet commenced to fetch, thereby preventing the instruction selected for generating a starting microinstruction address from being at the head of said instruction queue when said second means is fetching at least one starting microinstruction.

4. The queue of claim 3, further comprising:

a multiplexer having data inputs coupled to said instruction queue and to said pipeline controller and controlled by said pipeline controller, instructions in said instruction queue being directed to said data inputs of said multiplexer, said pipeline controller accessing said instructions by said controlling of said multiplexer.

5. The instruction prefetch queue of claim 3, wherein said microinstructions comprise microinstructions of a first type having a type field portion indicating that the instruction is one of a single microcode instruction which executes a machine instruction and microcode instructions of a second type having a type field portion indicating a routine of multiple microcode instructions which must be executed by said computer system to perform a single machine instruction, and wherein said second means when returning to the processor a starting microinstruction of said second type, is operable to cancel any further starting microinstruction fetches in progress, so that said fetches do not compete and instructions and program counter corresponding to said fetches of said microinstructions are not removed from the heads of the queues.

6. The instruction prefetch queue of claim 5, wherein upon completion of the execution of said routine, said second means is further operable to restart the fetch of any such canceled starting microinstruction fetches.

7. An instruction prefetch queue for a computer system, comprising:

(a) an instruction queue of length n, having a head, for holding macroinstructions to be performed;

(b) a program counter queue of length n, and having a head, for holding program counters therein corresponding to the macroinstructions in said instruction queue;

(c) a pipeline controller coupled to said instruction queue for selecting an instruction from said queue and generating a starting microinstruction address in response to said instruction;

(d) first means responsive to said microinstruction address to provide a microcode instruction; and (e) second means operable to fetch a starting microcode instruction and subsequent to completing said fetch operable to remove an instruction from said instruction queue and to remove a program counter from said program counter queue and operable to return said fetched microcode instruction to a processor for execution;

wherein said selected instruction is the instruction closest to the head of the queue which said second means has not yet commenced to fetch, thereby preventing the instruction selected for generating a starting microinstruction address from being at the head of said instruction queue when said second means is fetching at least one starting microinstruction;

(f) said pipeline controller including means to access any of the first m instructions in the queue, where m is less than or equal to n.

8. A method of executing certain machine instructions in a digital processor in a single clock cycle, comprising the steps of:

(a) providing a central processor for executing machine instructions;

(b) providing a main memory coupled to said central processor and having machine instructions to be executed by said central processor stored therein;

(c) decoding a machine instruction into its corresponding starting microcode address;

(d) providing a microcode memory coupled to said central processor having microcode instructions including a first set of microcode instructions stored therein, a first set of said microcode instructions being addressed by said starting microcode address, said microcode instructions in said first set containing microcode instructions of a first type having a type field portion indicating that the instruction is one of a single microcode instruction corresponding to a machine instruction and containing microcode instructions of a second type having a type field portion indicating that a routine of multiple instructions must be executed to perform a single machine instruction;
(e) generating a microcode instruction corresponding to said microcode address;
(f) transferring said microcode instructions from said microcode memory to said central processor for execution therein;
(g) determining the type field from said microcode instructions;
(h) responsive to said microcode instructions of said first type, causing a next instruction to be executed to be the next available machine instruction, thereby enabling said digital processor to execute said machine instruction in a single cycle; and
(i) causing said next instruction to be executed to be a jump to a microcode routine which is executed to completion before executing the next instruction responsive to said microcode instructions of said second type.

* * * * *